United States Patent
Haze et al.

(10) Patent No.: US 7,318,085 B2
(45) Date of Patent: Jan. 8, 2008

(54) COMMUNICATION APPARATUS FOR ALLOWING DATA RECEPTION IN SPECIFIC MASTER OR SLAVE UNIT DEPENDING ON REQUEST FORWARDED TO REMOTE CENTER

(75) Inventors: Toshiro Haze, Kasugai (JP); Tokunori Kato, Ichinomiya (JP); Yuri Usami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 711 days.

(21) Appl. No.: 10/080,685

(22) Filed: Feb. 25, 2002

(65) Prior Publication Data

US 2002/0120707 A1  Aug. 29, 2002

(30) Foreign Application Priority Data

Feb. 28, 2001  (JP) .............................. 2001-055257

(51) Int. Cl.
*G06F 15/16* (2006.01)

(52) U.S. Cl. ...................... 709/208; 709/225; 358/468

(58) Field of Classification Search ................ 709/217, 709/208, 225; 358/1.15, 400, 405, 468; 707/104.1; 455/462, 556.1; 340/3.1
See application file for complete search history.

(56) References Cited

U.S. PATENT DOCUMENTS

| | | | | |
|---|---|---|---|---|
| 5,479,485 A | * | 12/1995 | Hayashi ..................... 455/462 |
| 5,519,763 A | * | 5/1996 | Namekawa et al. ..... 455/556.1 |
| 6,072,595 A | * | 6/2000 | Yoshiura et al. ............ 358/400 |
| 6,175,742 B1 | * | 1/2001 | Moteki et al. ............... 455/462 |
| 6,212,221 B1 | * | 4/2001 | Wakayama et al. ......... 375/133 |
| 6,266,159 B1 | * | 7/2001 | Otsuka et al. .............. 358/405 |
| 6,286,012 B1 | * | 9/2001 | Kindo et al. ............. 707/104.1 |
| 6,563,817 B1 | * | 5/2003 | Murai ......................... 370/356 |
| 6,615,049 B1 | * | 9/2003 | Yang ........................... 455/462 |
| 7,061,365 B2 | * | 6/2006 | Izumi ......................... 340/3.1 |
| 2001/0012121 A1 | * | 8/2001 | Yamamoto ................. 358/1.15 |
| 2004/0049556 A1 | * | 3/2004 | Watanabe ................... 709/217 |

* cited by examiner

*Primary Examiner*—Jungwon Chang
(74) *Attorney, Agent, or Firm*—Oliff & Berridge, PLC

(57) ABSTRACT

A facsimile machine has a base unit and a plurality of handsets. The base unit receives e-mail data from a remote center, and the handsets receive e-mail data via the base unit. When one of the base unit and the handsets requests the remote center to transmit e-mail data, a CPU of the base unit allows only the one that makes the request to receive and store therein the e-mail data.

27 Claims, 7 Drawing Sheets

US 7,318,085 B2

COMMUNICATION APPARATUS FOR ALLOWING DATA RECEPTION IN SPECIFIC MASTER OR SLAVE UNIT DEPENDING ON REQUEST FORWARDED TO REMOTE CENTER

BACKGROUND OF THE INVENTION

1. Field of Invention

The invention relates to a communication apparatus, such as a facsimile machine having a base unit and handsets that receive and display electronic mail (e-mail) data.

2. Description of Related Art

A recent-model facsimile machine has a base unit and handsets. The base unit receives e-mail data and displays and prints the received e-mail data, and the handsets receive e-mail data via the base unit and display the received e-mail data. Usually, e-mail data transmitted from a sender and arriving at a remote center, which functions as a mail server, is received by a recipient's device in response to a transmission request from the recipient's device to the remote center. The remote center also offers another mail service by which newly-arrived e-mail data is automatically transferred to the recipient's device. Typically, the base unit of the facsimile machine receives, as a gateway, e-mail data transmitted by request or transmitted automatically and stores the received e-mail data in its memory. When the e-mail data is confirmed using each handset, each handset retrieves the e-mail data received by the base unit and displays the retrieved e-mail data on a display of each handset.

However, when e-mail data is stored in the memory of the base unit as described above, e-mail data containing a private message cannot be confidentially confirmed on the display of each handset. In this case, by operating the base unit, the e-mail data can also be confirmed on a display of the base unit.

SUMMARY OF THE INVENTION

The invention provides a communication apparatus that can handle transmitted data confidentially according to the receiving mode. The invention also provides a computer program that accomplishes such confidential operation in the communication apparatus.

According to one aspect of the invention, a communication apparatus communicates with a remote center to receive data from the remote center. The communication apparatus includes a master unit that receives the data from the remote center, and a plurality of slave units that receive the data from the remote center, via the master unit, and a control circuit that controls the master unit and a plurality of slave units. When one of the master unit and a plurality of slave units makes a request to the remote center for transmitting the data, the control unit allows only the one that makes the request to receive and store therein the data transmitted from the remote center.

BRIEF DESCRIPTION OF THE DRAWINGS

A preferred embodiment of the invention will be described in detail with reference to the following figures wherein.

DETAILED DESCRIPTION OF PREFERRED EMBODIMENTS

One embodiment of the invention will be described in detail with reference to the accompanying drawings.

Figure 1:
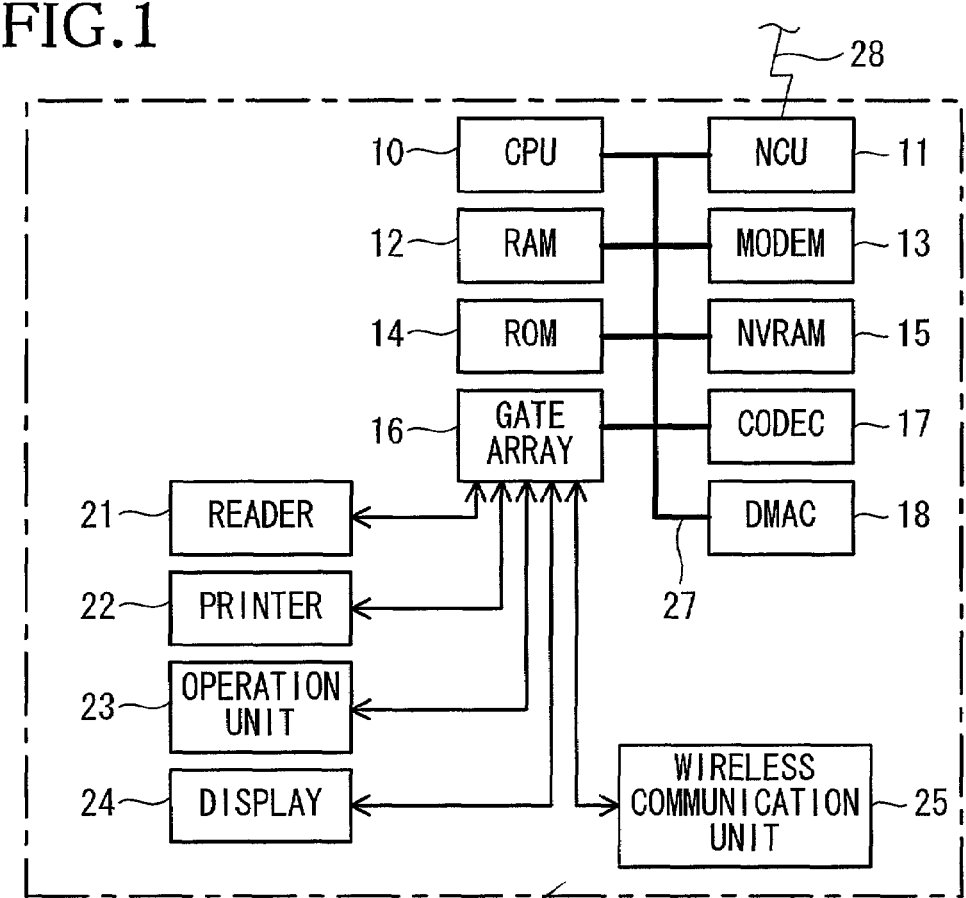
FIG. 1 is a block diagram showing a facsimile machine as a communication apparatus according to an embodiment of the invention.
Figure 1:
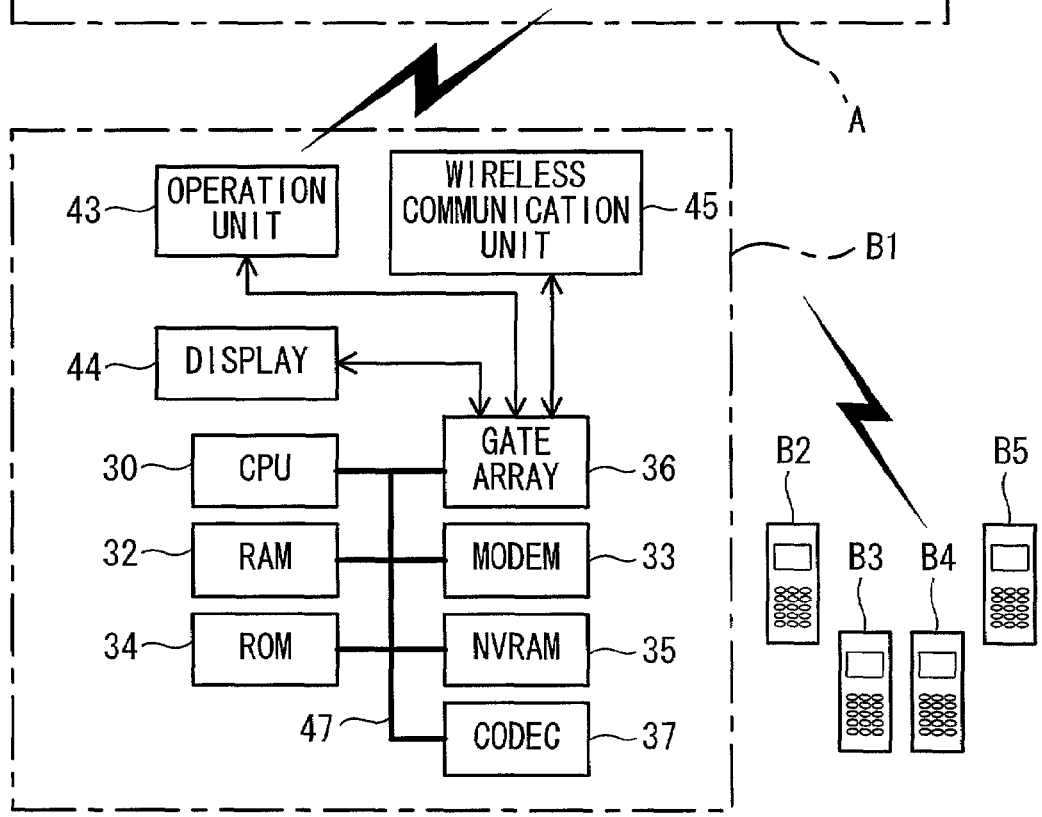
Figure 2:
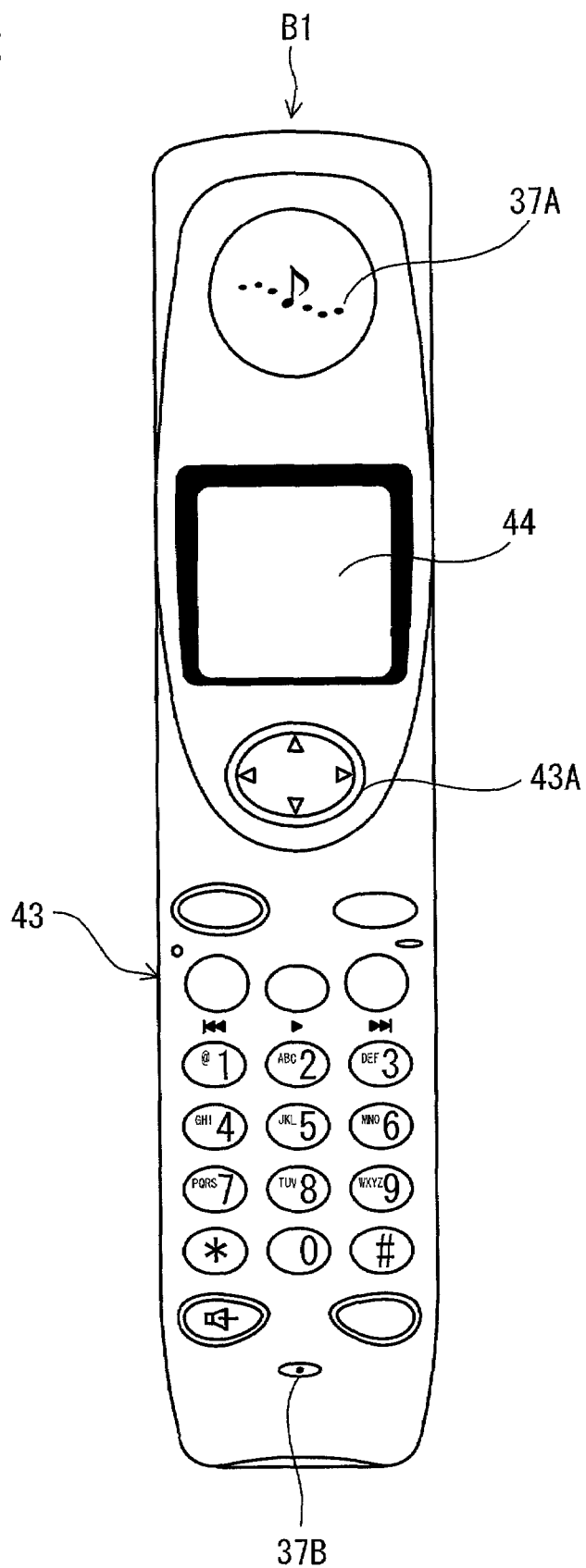
FIG. 2 is an external view showing an appearance of a handset of the facsimile machine.
Figure 3:
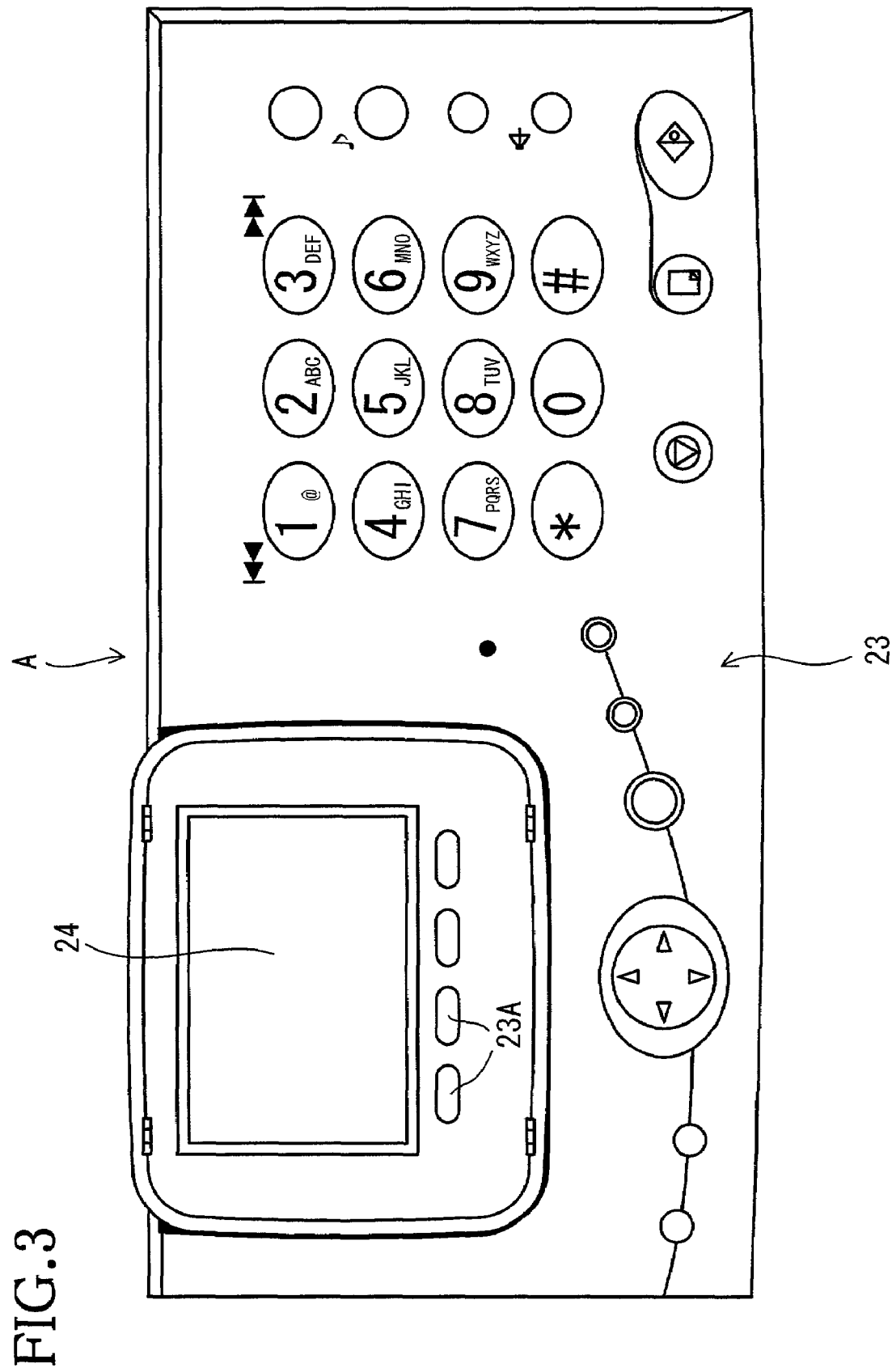
FIG. 3 is an external view showing an appearance of a base unit of the facsimile machine.

FIG. 1 is a block diagram showing a facsimile machine as a communication apparatus according to an embodiment of the invention. As shown in FIG. 1, the facsimile machine according to the invention includes a base unit A and a plurality of cordless handsets B1-B5. Voice signals and various data can be exchanged between the base unit A and the handsets B1-B5 as well as between the handsets B1-B5. In the following description, the base unit A of the facsimile machine functions as a master unit and the cordless handsets B1-B5 are function as slave units. FIG. 2 shows an appearance of the handset B1 with microphone 37B. Because the handsets B2-B5 have the same structure as the handset B1, a detailed description thereof is omitted. FIG. 3 shows an appearance of the base unit A.

As shown in FIG. 1, the base unit A includes a CPU 10, a NCU (network control unit) 11, a RAM 12, a modem 13, a ROM 14, a NVRAM (non-volatile RAM) 15, a gate array 16, a codec 17, a DMAC (direct memory access controller) 18, a reader 21, a printer 22, an operation unit 23, a display 24, and a wireless communication unit 25. The CPU 10, NCU 11, RAM 12, modem 13, ROM 14, NVRAM 15, gate array 16, codec 17 and the DMAC 18 are interconnected by a bus 27. The bus 27 includes an address bus, a data bus, and a control signal line. The gate array 16 is connected to the reader 21, printer 22, operation unit 23, display 24, and the wireless communication unit 25. The NCU 11 is connected to a public telephone line 28.

The CPU 10 entirely controls the operation of the base unit A. The NCU 11 connected to the public telephone line 28 performs network control. The RAM 12 provides a work area for the CPU 10 and a buffer that stores various data. The modem 13 modulates and demodulates voice signals. The ROM 14 stores programs to be executed by the CPU 10. The NVRAM 15 stores various information and data. The gate array 16 functions as an interface between the CPU 10 and the reader 21, printer 22, operation unit 23, display 24, and the wireless communication unit 25. The codec 17 encodes and decodes voice signals and data. The DMAC 18 directly exchanges data with the RAM 12 and other devices without the intervention of the CPU 10.

The reader 21, which includes an image sensor and an LED, reads an image including characters and graphics from a document. The printer 22 prints an image including characters and graphics on a sheet by an ink jet method or other methods. The operation unit 23 has numeric keys and various buttons, as shown in FIG. 3 and transmits input signals to the CPU 10 in response to operations by the user. As shown in FIG. 3, the display 24 has, for example, a liquid crystal display with 320- by 240-dot resolution and displays various data and information. The wireless communication unit 25 has an antenna (not shown) and exchanges various data and information with handsets B1-B5 by radio waves.

The handset B1 includes a CPU 30, a RAM 32, a modem 33, a ROM 34, a NVRAM (non-volatile RAM) 35, a gate array 36, a codec 37, an operation unit 43, a display 44, and a wireless communication unit 45. The CPU 30, RAM 32, modem 33, ROM 34, NVRAM 35, gate array 36, and the codec 37 are interconnected by a bus 47. The bus 47 includes an address bus, a data bus, and a control signal line. The gate array 36 is connected to the operation unit 43, display 44, and the wireless communication unit 45.

The CPU 30 controls operation of the handset B1. The RAM 32 provides a work area for the CPU 30 and a buffer that stores various data. The modem 33 modulates and demodulates voice signals. The ROM 34 stores programs to be executed by the CPU 30. The NVRAM 35 stores various information and data. The gate array 36 functions as an interface between the CPU 30 and operation unit 43, display 44, and the communication unit 45. The codec 37 encodes and decodes voice signals and data.

As shown in FIG. 2, the operation unit 43 has numeric keys and various buttons and transmits input signals to the CPU 30 in response to operations by the user. The display 44 has a liquid crystal display capable of displaying several lines of characters and numerals and displays various data and information. The wireless communication unit 45 has an antenna (not shown) and exchanges various data and information with the base unit A and other handsets B2-B5 by radio waves.

The facsimile machine according to one embodiment of the invention exchanges, via the public telephone line, e-mail data with a remote center that functions as a mail server (not shown). The base unit A and the handsets B1-B5 receive e-mail data in either a normal or automatic receiving mode. In the normal receiving mode, after e-mail data addressed to the e-mail address of the facsimile machine arrives at the remote center, the base unit A or any one of the handsets B1-B5 requests the remote center to transmit the e-mail data. In the automatic receiving mode, the base unit A and the handsets B1-B5 receive e-mail data newly arrived and automatically transmitted from the remote center. In either mode, the base unit A receives e-mail data, as a gateway. Before using the automatic receiving mode, the facsimile machine notifies the remote center of such mode setting, and the setting information on the automatic receiving mode is stored in the NVRAM 15 of the base unit A.

The facsimile machine has a plurality of e-mail addresses, which are allocated to the base unit A and the handsets B1-B5. The user of each of the base unit A and the handsets B1-B5 can receive e-mail data addressed to the user's unit or handset by designating the e-mail address allocated to the user's unit or handset. For example, when the handset B1 connects to the remote center, a list of e-mail addresses of the facsimile machine, which are registered with the remote center, is displayed on the display 44 of the handset B1. When e-mail data has arrived at any e-mail address, the applicable e-mail address is marked in the list. Such marking allows the user of the handset B1 to check if e-mail data addressed to the handset B1 has arrived. After checking that the e-mail address of the handset B1 is marked, the user designates the e-mail address of the handset B1 in the list to request the remote center to transmit the e-mail data.

When the handset B1 requests the remote center to transmit the e-mail data, the base unit A receives the e-mail data first and then transmits the received e-mail data to the handset B1, without storing it in the memory of the base unit A. Thus, the e-mail data is not stored in any of the base unit A and other handsets B2-B5. Any record indicating the receiving time and the sender's e-mail address is not transferred, either, to any of the base unit A and other handsets B2-B5. The e-mail data retrieved into the memory of the handset B1 in response to the transmission request from the handset B1 is only displayed on its display 44 and confirmed by the user. Such retrieval of e-mail data by the handset B1 is mainly controlled by the CPU 10 of the base unit A. The CPU 10 performs retrieval control in the same manner when the base unit A or any one of other handsets B2-B5 makes a transmission request.

When the base unit A requests the remote center to transmit e-mail data, only the base unit A receives and retrieves the e-mail data transmitted from the remote center. In this case, the received e-mail data is printed by the printer 22. At this time, if a password is set as authentication information for the received e-mail data, the received e-mail data is handled according to the result of authentication and is not printed upon reception.

In contrast, when the facsimile machine is set in the automatic receiving mode where the facsimile machine automatically receives e-mail data addressed thereto from the remote center, the base unit A receives e-mail data first. Then, the base unit A stores the received e-mail data in its memory and transmits the received e-mail data to all the handsets B1-B5. In this case, the received e-mail data as well as the record indicating the receiving time and the sender's e-mail address are stored in the base unit A and all the handsets B1-B5. Thus, the automatically transmitted e-mail data is confirmed on the base unit A and all the handsets B1-B5. In a word, when the facsimile machine receives e-mail data in the automatic receiving mode, the received e-mail data is handled publicly.

As described above, pieces of e-mail data and their records are stored in each memory of the base unit A and the handsets B1-B5, according to the receiving mode used. In each of the base unit A and the handsets B1-B5, an e-mail message contained in each piece of e-mail data can be displayed by predetermined operations. To view an e-mail message, the user displays a list of records on received pieces of e-mail data and selects a desired piece of e-mail data. Pieces of e-mail data that have not yet been displayed are listed in the unread e-mail list, while pieces of e-mail data that have already been displayed are listed in the already-read e-mail list. In other words, each piece of e-mail data is stored in each memory of the base unit A and the handsets B1-B5 while being classified as unread or already-read.

Unread pieces of e-mail data stored in the facsimile machine can be accessed from remote terminals, such as a personal computer and a cellular phone, and can be retrieved collectively by the remote terminals. Already-read pieces of e-mail data stored in the facsimile machine can be deleted collectively upon the access from the remote terminals to the facsimile machine.

Under the control of the CPU 10 of the base unit A, when the base unit A or any one of the handsets B1-B5 requests the remote center to transmit e-mail data, only the requesting device can obtain information on the transmitted data. All other devices are prohibited from obtaining any information on the transmitted data.

The ROM 14 of the base unit A stores a computer program for controlling the communication apparatus having the base unit A and the handset B1-B5 to accomplish the above-described prohibition. In the communication apparatus, the base unit A can receive, via the remote center, data transmitted from a sender and display the transmitted data, and the handsets B1-B5 can receive the transmitted data via the base unit A and display the transmitted data.

Operations of the base unit A and the handset B1 will now be described.

Figure 4:
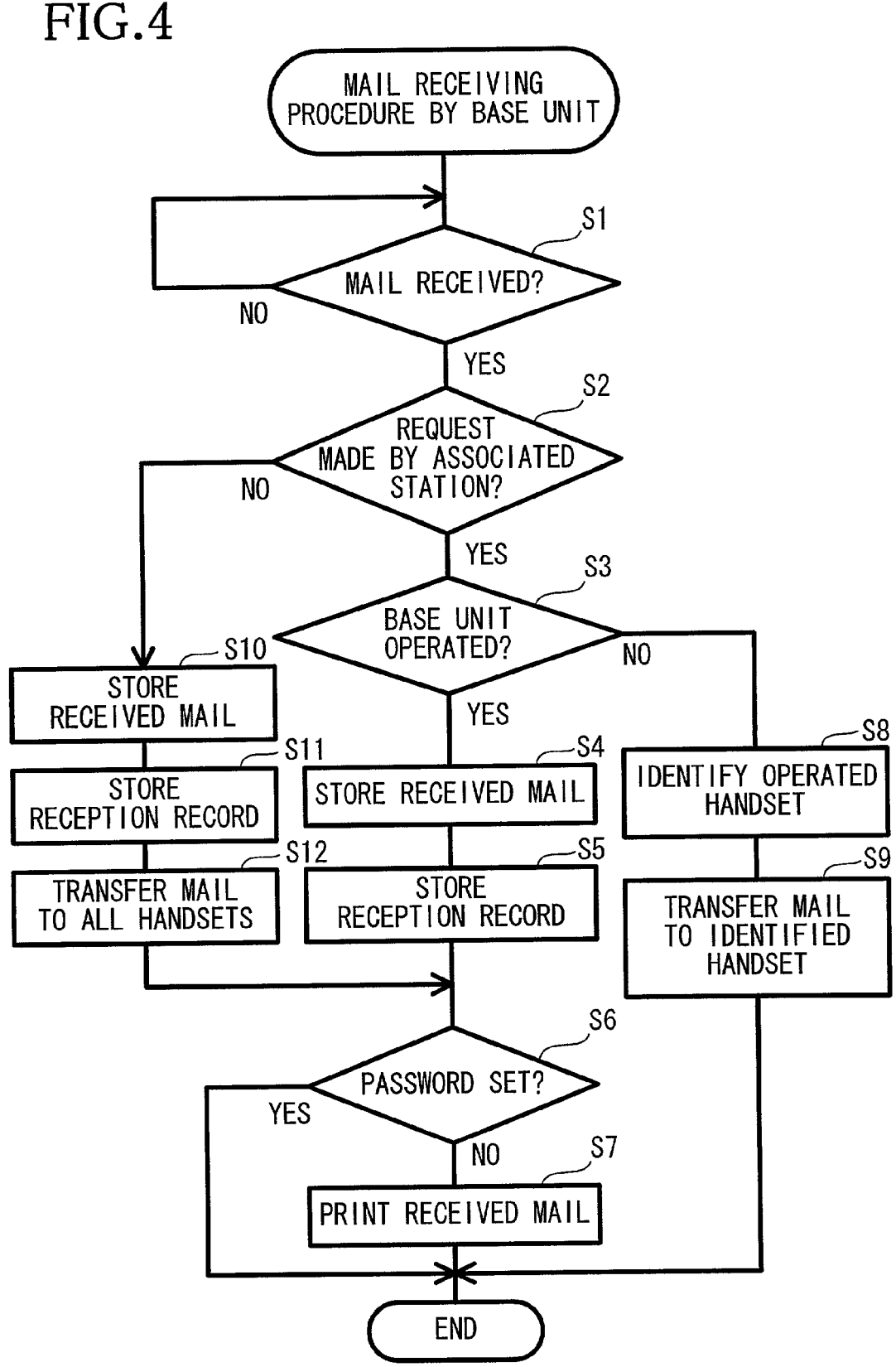
FIG. 4 is a flowchart showing steps taken by the base unit to receive e-mail data.
Figure 5:
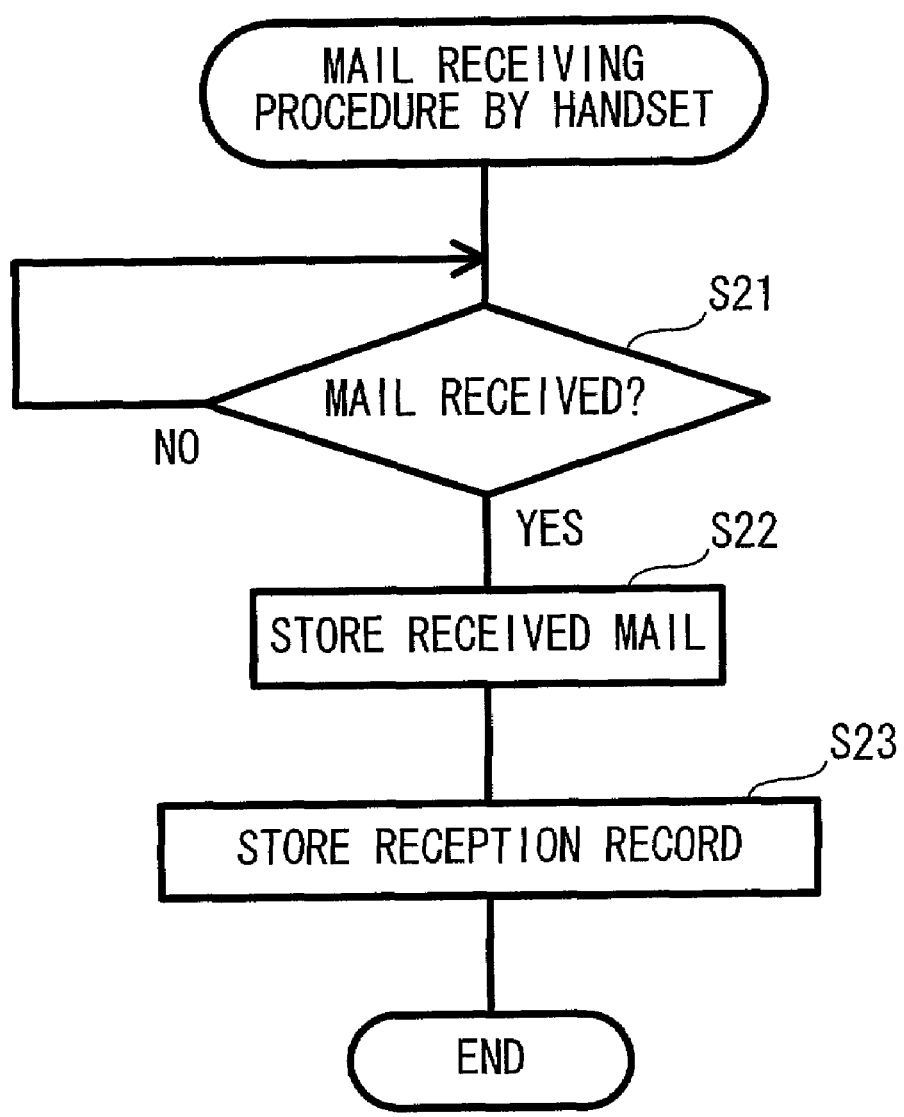
FIG. 5 is a flowchart showing steps taken by the handset to receive e-mail data.
Figure 6:
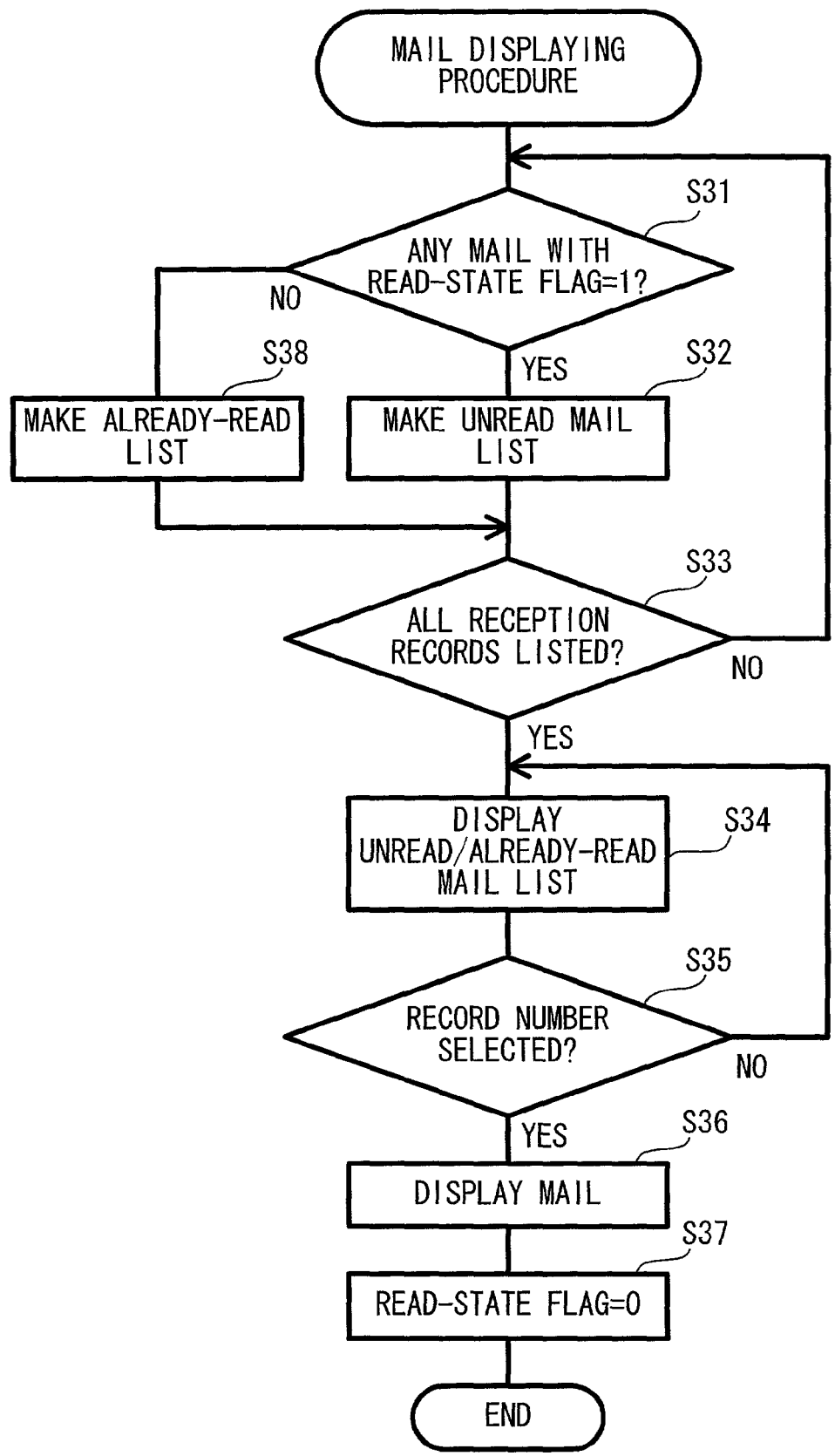
FIG. 6 is a flowchart showing steps taken, for example, by the base unit to display e-mail data.
Figure 7:
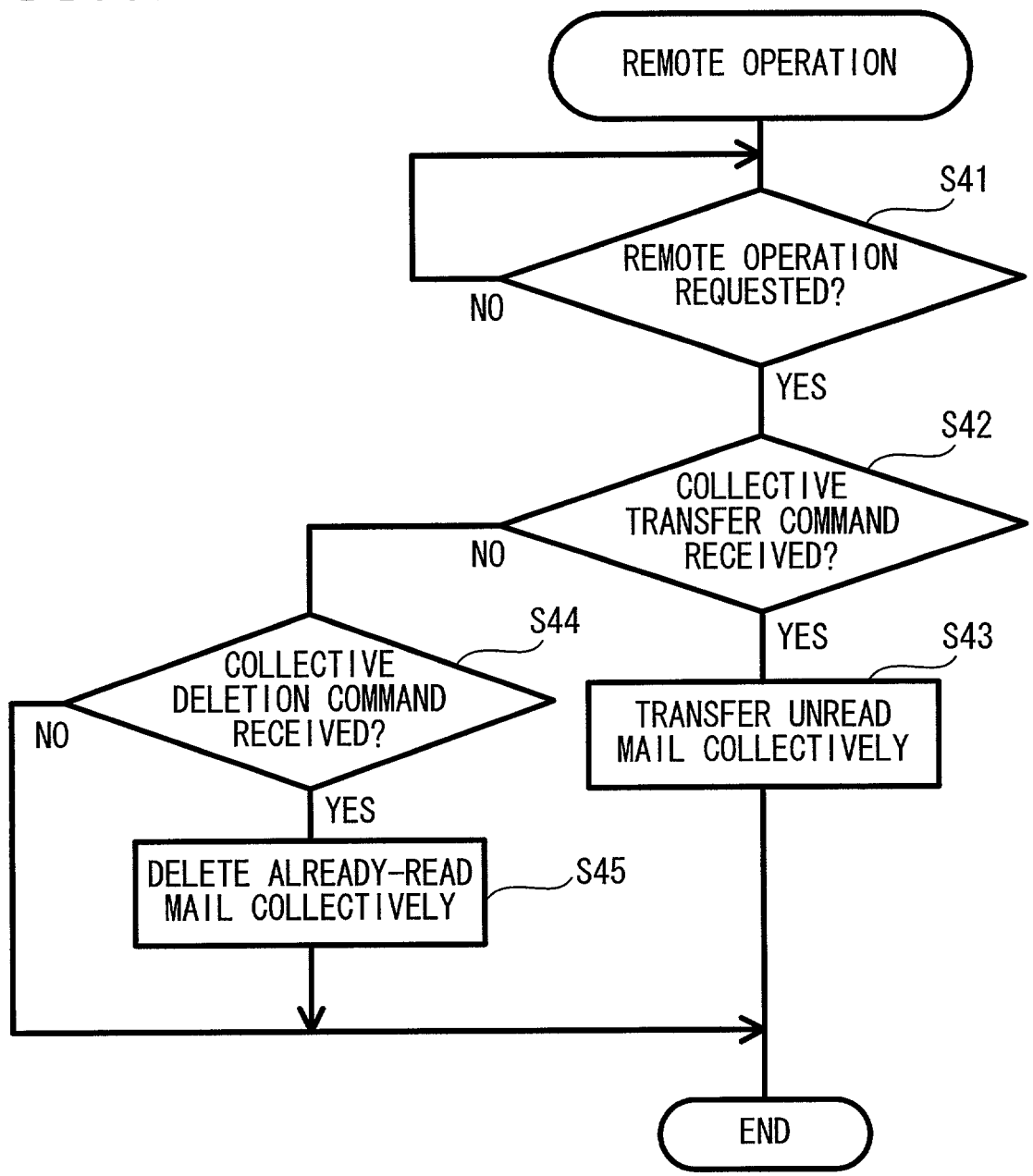
FIG. 7 is a flowchart showing steps taken, for example, by the base unit to perform remote operation.

FIG. 4 is a flowchart showing the steps taken by the base unit A to receive e-mail data. FIG. 5 is a flowchart showing the steps taken by the handset B to receive e-mail data. FIG. 6 is a flowchart showing the steps taken, for example, by the base unit A to display e-mail data. FIG. 7 is a flowchart showing the steps taken, for example, by the base unit A to perform remote operation.

Referring now to FIG. 4, the steps taken by the base unit A to receive e-mail data will be described. The base unit A receives e-mail data in either the above-described normal or automatic receiving mode.

When the base unit A receives a piece of e-mail data in either the normal or automatic receiving mode (S1: YES), the CPU 10 of the base unit A determines whether the piece of e-mail data has been transmitted in response to a transmission request from one of associated stations to the remote center (S2). The associated stations refer to the base unit A and the handsets B1-B5. The received piece of e-mail data is stored in a memory, such as the RAM 12, which is used as a temporary buffer.

When any one of the associated stations has made the transmission request (S2: YES), the CPU 10 determines whether the base unit A has been operated to make the transmission request (S3).

When the transmission request has been made by operating the base unit A (S3: YES), the CPU 10 stores the received piece of e-mail data in the memory, such as the RAM 12 (S4). As a result, the received piece of e-mail data is entirely stored in the base unit A, and the stored piece of e-mail data is retrieved later for display and printout.

The CPU 10 also produces a reception record indicating the receiving time and the sender's e-mail address and stores it in the memory (S5). The reception record is used in the mail displaying procedure, which will be described later. The reception record is stored in the memory in association with the received piece of e-mail data. At this time, a read-state flag "1", which indicates an unread state, is set for the newly-arrived piece of e-mail data and stored in the memory together with the reception record.

Then, the CPU 10 determines whether a password for printout is set for the received piece of e-mail data (S6).

No password is set for the received piece of e-mail data (S6: NO), the CPU 10 prints the received piece of e-mail data on the printer (S7) and ends the mail receiving procedure by the base unit A.

When the password is set for the received piece of e-mail data (S6: YES), the CPU 10 ends the mail receiving procedure by the base unit A without printing the received piece of e-mail data on the printer 22. Thus, even when the CPU 10 receives a piece of e-mail data in response to the transmission request from the base unit A, the received piece of e-mail data is not printed immediately upon reception if an effective password is set for the received piece of e-mail data. The CPU 10 may be designed to proceed with printing the received mail (S7) when the password is entered correctly in the base unit A.

When any one of the handsets B1-B5 has made the transmission request (S3: NO), instead of the base unit A, the CPU 10 identifies the handset that has been operated to make the transmission request (S8).

Then, the CPU 10 transmits the received piece of e-mail data to the identified handset (S9) and completes the mail receiving procedure by the base unit A. In this case, the received piece of e-mail data is transmitted to only the handset that has made the transmission request, and neither the piece of e-mail data nor the reception record are transferred to the base unit A and other handsets.

When the CPU 10 receives the piece of e-mail data by automatic transmission from the remote center (S2: NO), the CPU 10 stores the received piece of e-mail data in the memory, such as the RAM 12 (S10), in the same manner as in S4 and S5. The CPU 10 also produces a reception record indicating the receiving time and the sender's e-mail address and stores it in the memory (S11).

Then, the CPU 10 transmits the received piece of e-mail data to all the handsets B1-B5 (S12) and proceeds with S6. In this way, when the CPU of the base unit 10 receives the piece of e-mail data transmitted automatically from the remote center, the transmitted piece of e-mail data is stored in the base unit A as well as all the handsets B1-B5.

When the base unit A does not receive any piece of e-mail data (Si: NO), the CPU 10 does not proceed with S2 and later steps until the base unit A receives a piece of e-mail data.

Referring now to FIG. 5, the steps taken by the handset B1 to receive e-mail data will be described. After steps S9 and S12, the handset B1 receives a piece of e-mail data transmitted from the base unit A.

When the handset B1 receives a piece of e-mail data from the base unit A (S21: YES), the CPU 30 of the handset B1 stores the received piece of e-mail data in a memory, such as the RAM 32 (S22). As a result, the received piece of e-mail data is entirely stored in the handset B1 and retrieved later for display.

The CPU 30 also produces a reception record indicating the receiving time and the sender's e-mail address and stores it in the memory (S23). Then, the CPU ends the mail receiving procedure by the handset B1. The reception record is stored in the memory in association with the received piece of e-mail data. At this time, a read-state flag "1", which indicates an unread state, is set for the newly-arrived piece of e-mail data and stored in the memory together with the reception record.

When the handset B1 does not receive any piece of e-mail data (S21: NO), the CPU 30 does not proceed with S22 and later steps until the handset B1 receives a piece of e-mail data.

Referring now to FIG. 6, the steps followed to display e-mail data stored in the base unit A will be described. FIG. 6 shows the steps taken, for example, by the base unit A, but the same steps are taken by the handset B1.

When the user operates the operation unit 23 of the base unit A in a predetermined manner to display e-mail data, the CPU 10 of the base unit A checks whether the read-state flag "1" is set for any piece of e-mail data currently stored in the memory of the base unit A (S31). The read-state flag is bit information written in the memory when a reception record is produced for a piece of e-mail data newly arrived from the remote center. The read-state flag indicates whether a piece of e-mail data has not yet been displayed. The read-state flag "1" is set for a newly arrived e-mail data.

When there is any piece of e-mail data with the read-state flag "1" in the memory of the base unit A (S31: YES), the CPU 10 lists the reception record thereof in the unread e-mail list (S32).

On the other hand, when there is any piece of e-mail data with the read-state flag "0" (S31: NO), the CPU 10 lists the reception record thereof in the already-read e-mail list (S38).

After the CPU 10 lists all the reception records stored in the memory of the base unit A (S33: YES), the CPU 10 displays the reception records in the unread e-mail list and in the already-read e-mail list separately on the display 24 (S34). The unread e-mail list and the already-read e-mail list can be displayed in this order or in the reverse order according to the selection by the user. If considerably many reception records are listed in the unread or already-read e-mail list, the reception records can be displayed in groups of 100 records. Alternatively, a mark indicating the unread or already-read state can be attached to each reception record.

When the user selects the number of a desired reception record by scrolling through the list of reception records displayed as described above (S35: YES), the CPU 10 reads, from the memory, a piece of e-mail data corresponding to the selected reception record and displays a message contained in the piece of e-mail data on the display 24 (S36).

Then, the CPU 10 rewrites the read-state flag for the displayed piece of e-mail data to "0" in the memory (S37), thereby ending the mail displaying procedure. When the read-state flag "0" has already been written for the displayed piece of e-mail data in the memory, rewriting may be omitted in S37.

When the user does not select the number of a desired reception record in S35 (S35: NO), the CPU 10 returns to S34 and keeps displaying the list of reception records.

When the CPU 10 has not finished listing all the reception records in S33 (S33: NO), the CPU 10 repeats S31 to finish listing all the reception records.

Referring now to FIG. 7, the steps followed when e-mail data stored in the base unit A is remotely operated from an external terminal will be described. FIG. 7 shows the steps taken, for example, by the base unit A, but the same steps are taken by the handset B1.

The CPU 10 of the base unit A determines whether the CPU 10 receives a command requesting remote operation from an external terminal via the public telephone line 28 (S41). The command requesting remote operation includes a password to receive approval for remote operation and a code for designating the base unit A as a target unit of remote operation, and is sent from the external terminal using DTMF (dial tone multi frequency) signals.

When the CPU 10 receives a command requesting remote operation (S41: YES), the CPU 10 determines whether the received command is a command requesting collective transfer (S42). The command for collective transfer requests collective transfer of pieces of e-mail data stored in the memory to the external terminal.

When the CPU 10 receives a command for collective transfer (S42: YES), the CPU 10 collectively transmits unread pieces of e-mail data stored in the memory of the base unit A to the external terminal (S43). Thereafter, the CPU 10 ends the remote operation. In this case, unread pieces of e-mail data are retrieved based on the read-state flag "1", which is written in the memory in association with an unread piece of e-mail data.

When the CPU 10 receives a command for collective deletion (S44: YES), instead of a command for collective transfer (S42: NO), the CPU 10 collectively deletes already-read pieces of e-mail data stored in the memory of the base unit A (S45) and ends the remote operation. In this case, already-read pieces of e-mail data are retrieved based on the read-state flag "0", which is written in the memory in association with an already-read piece of e-mail data. Reception records corresponding to the deleted already-read pieces of e-mail data are deleted at the same time.

When the CPU 10 receives commands other than a command for collective deletion (S44: NO), the CPU 10 ends the remote operation and proceeds with other procedures corresponding to the received command.

When the CPU 10 does not receive a command requesting remote operation in S41 (S41: NO), the CPU 10 does not proceed with S42 and the later steps until the CPU 10 receives a command requesting remote operation.

In the above-described facsimile machine having the base unit A and the handsets B1-B5, when the handset B1 independently requests the remote center to transmit e-mail data, the handset B1 receives the e-mail data via the base unit A. The e-mail data is stored, as a private message, only in the handset B1 and is not stored in the base unit A or other handsets B2-B5. The e-mail data is confidentially displayed on the handset B1. When the base unit A or any one of the handsets B2-B5 makes a transmission request to the remote center, the received e-mail data can be handled in the same manner.

In contrast, when the base unit A receives e-mail data from the remote center by automatic transmission, the received e-mail data is stored in the base unit A and all the handsets B1-B5. The received e-mail data is publicly displayed on the base unit A and the handsets B1-B5.

When the base unit A receives e-mail data in response to a transmission request from the base unit A to the remote center, the e-mail data received by the base unit A can be printed by its printer. On the contrary, when the base unit A temporarily receives e-mail data in response to a transmission request from the handset B1 to the remote center, the e-mail data temporarily received by the base unit A is not be printed by its printer. The e-mail data received by the handset, via the base unit A is confidentially displayed on the handset B1.

When the base unit A requests the remote center to transmit e-mail data and receives from the remote center the e-mail data for which authentication information is set, the received e-mail data is not printed unless authentication is performed as required. Thus, confidentiality of the received e-mail data is enhanced.

Further, pieces of e-mail data stored in each of the base unit A and the handsets B1-B5 are classified into unread and already-read pieces of e-mail data and listed in each display. This allows the user to confirm the e-mail data receiving condition at a glance.

Further, when an external terminal designates one of the base unit A and the handsets B1-B5 and makes a request for data processing, the designated one of the base unit A and the handsets B1-B5 collectively transmits unread pieces of e-mail data to the external terminal or deletes already-read pieces of e-mail data.

Although, in the above-described embodiment, procedures for receiving and displaying e-mail data have been mainly described, the base unit A and the handsets B1-B5 can prepare and transmit e-mail data, as well. A recipient's e-mail address must be entered to transmit e-mail data from the base unit A and the handsets B1-B5. E-mail addresses can be registered in a memory, as required, in a manner similar to that registering telephone numbers in a memory. When e-mail addresses are registered in the memory of the base unit A, one of function keys 23A provided below the display 24 can be used as a registration button. Various functions are allocated to function keys 23A to correspond the function names displayed on the display 24. In the registration mode of e-mail addresses or telephone numbers, a function key 23A as a registration button is displayed on the display 24. The maximum number of e-mail addresses or telephone numbers to be registered is set depending on the available memory, and the registration button is not displayed even in the registration mode when the maximum number has been reached. Thus, the registration button not being displayed substitutes as a message informing the user that the maximum number has been reached and no more registration is allowed. Similarly, the function key 43A provided below the display 44 can be used as a registration button on the handset B1.

Although e-mail data is handled in the above-described embodiment, facsimile data can also be handled in the same manner.

Instead of the facsimile machine, a stationary telephone and a personal computer can be the master unit. When a personal computer is the master unit, the invention is realized by a computer program that executes each step described in the above embodiment. A PDA (personal digital assistant) can be used as the slave unit, and the invention is also realized by a computer program that executes each step described in the above embodiment.

The steps executed by the CPU 10 of the base unit A may be executed by the CPU 30 of the handset B1. The handset B1 may be provided with a function of printing e-mail data.

While the invention has been described with reference to the specific embodiment, the description of the embodiment is illustrative only and is not to be construed as limiting the scope of the invention. Various other modifications and changes may be occur to those skilled in the art without departing from the spirit and scope of the invention.

What is claimed is:

1. A communication apparatus that communicates with a remote center to receive data from the remote center, the communication apparatus comprising:
    a master unit that receives the data from the remote center;
    a plurality of slave units that receive the data from the remote center, via the master unit; and
    a control circuit that controls the master unit and the plurality of slave units, wherein when one of the plurality of slave units makes a request to the remote center for transmitting the data, only the one of the plurality of slave units of the communication apparatus that makes the request is allowed to receive and store therein the entire contents of the data transmitted from the remote center, while the control circuit prohibits the master unit from storing the entire contents of the data transmitted from the remote center and further prohibits other ones of the plurality of slave units from receiving and storing therein the data transmitted from the remote center,
    wherein the master unit includes a facsimile machine, and one of the plurality of slave units includes a handset.

2. The communication apparatus according to claim 1, wherein the remote center has a function of automatically transmitting the data to the master unit, and the control circuit makes the master unit to transfer the data automatically received from the remote center to the plurality of slave units.

3. The communication apparatus according to claim 1, wherein the master unit has a printer, and the control circuit allows, only when the master unit makes the request, the printer to print the data received by and stored in the master unit.

4. The communication apparatus according to claim 3, wherein the control circuit prohibits the printer from printing the data stored in the master unit when the control circuit detects authentication information set for the data stored.

5. The communication apparatus according to claim 1, wherein the master unit has a display on which the data stored in the master unit is displayed and each one of the plurality of slave units has a display on which the data stored in each one of the plurality of slave units is displayed, and the control circuit allows the display of the master unit and the display of each one of the plurality of slave units to list thereon reception records associated with pieces of the data stored in the master unit and each one of the plurality of slave units, respectively, wherein each one of the reception records includes an indication as to whether an associated piece of the data has already been displayed.

6. The communication apparatus according to claim 5, wherein the communication apparatus further communicates with an external terminal, and when the external terminal designates one of the master unit and the plurality of slave units, the control circuit handles collectively, in response to a request from the external terminal, the pieces of the data stored in the designated unit by classifying the pieces of the data into already-displayed pieces and unread pieces.

7. The communication apparatus according to claim 1, wherein each of the plurality of slave units is capable of making a request to the remote center for transmitting the data, receiving and storing the data transmitted from the remote center, and displaying at least a part of the data transmitted from the remote center.

8. The communication apparatus according to claim 1, each of the plurality of slave units is assigned a respective address, and the one of the plurality of slave units that makes the request is identified by the address of the one of the plurality of slave units to be allowed to receive and store the data transmitted from the remote center.

9. A communication apparatus that communicates with a remote center to receive data from the remote center, the communication apparatus comprising:
    a master unit that receives the data from the remote center;
    a plurality of slave units that receive the data from the remote center, via the master unit; and
    a control circuit that controls the master unit and the plurality of slave units, wherein when one of the plurality of slave units makes a request to the remote center for transmitting the data, the control circuit prohibits the master unit from storing the entire contents of the data transmitted from the remote center and further prohibits other ones of the plurality of slave units from receiving and storing therein the data transmitted from the remote center,
    wherein the master unit includes a facsimile machine, and one of the plurality of slave units includes a handset.

10. The communication apparatus according to claim 9, wherein the remote center has a function of automatically transmitting the data to the master unit, and the control circuit makes the master unit to transfer the data automatically received from the remote center to the plurality of slave units.

11. The communication apparatus according to claim 9, wherein the master unit has a printer, and the control circuit allows, only when the master unit is not prohibited from storing therein the data transmitted from the remote center, the printer to print the data received by and stored in the master unit.

12. The communication apparatus according to claim 11, wherein the control circuit prohibits the printer from printing the data stored in the master unit when the control circuit detects authentication information set for the data stored.

13. The communication apparatus according to claim 9, wherein the master unit has a display on which the data stored in the master unit is displayed and each one of the plurality of slave units has a display on which the data stored in each one of the plurality of slave units is displayed, and the control circuit allows the display of the master unit and the display of each one of the plurality of slave units to list thereon reception records associated with pieces of the data stored in the master unit and each one of the plurality of slave units, respectively, wherein each one of the reception records includes an indication as to whether an associated piece of the data has already been displayed.

14. The communication apparatus according to claim 13, wherein the communication apparatus further communicates with an external terminal, and when the external terminal designates one of the master unit and the plurality of slave units, the control circuit handles collectively, in response to a request from the external terminal, the pieces of the data stored in the designated unit by classifying the pieces of the data into already-displayed pieces and unread pieces.

15. A communication apparatus that communicates with a remote center to receive data from the remote center and transfers the data to a plurality of slave units, the communication apparatus comprising:

a control circuit that controls the communication apparatus and the plurality of slave units, wherein when one of the plurality of slave units makes a request to the remote center for transmitting the data, only the one of the plurality of slave units of the communication apparatus that makes the request is allowed to receive and store therein the entire contents of the data transmitted from the remote center, while the control circuit prohibits the communication apparatus from storing the entire contents of the data transmitted from the remote center and further prohibits other ones of the plurality of slave units from receiving and storing therein the data transmitted from the remote center, wherein the communication apparatus includes a facsimile machine, and one of the plurality of slave units includes a handset.

16. The communication apparatus according to claim 15, wherein the remote center has a function of automatically transmitting the data to the communication apparatus, and the control circuit makes the communication apparatus transfer the data automatically received from the remote center to the plurality of slave units.

17. The communication apparatus according to claim 15, further comprising a printer, wherein the control circuit allows, only when the communication apparatus makes the request, the printer to print the data received by and stored in the communication apparatus.

18. The communication apparatus according to claim 15, wherein the control circuit prohibits the printer from printing the data stored in the communication apparatus when the control circuit detects authentication information set for the data stored.

19. The communication apparatus according to claim 18 further comprising a display on which the data stored in the communication apparatus is displayed, and wherein the control circuit allows the display to list thereon reception records associated with pieces of the data stored in the communication apparatus, and each one of the reception records includes an indication as to whether an associated piece of the data has already been displayed on the display.

20. The communication apparatus according to claim 19, wherein the communication apparatus further communicates with an external terminal, and handles collectively, in response to a request from the external terminal, the pieces of the data stored in the communication apparatus by classifying the pieces of the data into already-displayed pieces and unread pieces.

21. A communication apparatus that associates with a master unit that communicates with a remote center to receive data from the remote center, and the communication apparatus that receives the data from the master unit, the communication apparatus comprising:

a control circuit that controls the communication apparatus and the master unit, wherein when the communication apparatus makes a request to the remote center for transmitting the data, only the communication apparatus is allowed to receive and store therein the entire contents of the data transmitted from the remote center, while the control circuit prohibits the master unit from storing the entire contents of the data transmitted from the remote center, wherein the master unit includes a facsimile machine, and the communication apparatus includes a handset.

22. The communication apparatus according to claim 21, wherein when the communication apparatus makes the request, the control circuit allows only the communication apparatus to receive the data transmitted from the remote center, via the master unit, and store therein the data.

23. The communication apparatus according to claim 22, wherein the remote center has a function of automatically transmitting the data to the master unit, and the control circuit makes the master unit transfer the data automatically received from the remote center to the communication apparatus.

24. The communication apparatus according to claim 22 further comprising a printer, wherein the control circuit allows, only when the communication apparatus makes the request, the printer to print the data received by and stored in the communication apparatus.

25. The communication apparatus according to claim 24, wherein the control circuit prohibits the printer from printing the data stored in the communication apparatus when the control circuit detects authentication information set for the data stored.

26. The communication apparatus according to claim 24, wherein the communication apparatus further communicates with an external terminal, and the control circuit handles collectively, in response to a request from the external terminal, the pieces of the data stored in the communication apparatus by classifying the pieces of the data into already-displayed pieces and unread pieces.

27. The communication apparatus according to claim 22 further comprising a display on which the data stored in the communication apparatus is displayed, wherein the control circuit allows the display to list thereon reception records associated with pieces of the data stored in the communication apparatus, each one of the reception records includes an indication as to whether an associated piece of the data has already been displayed on the display.

* * * * *